United States Patent
Breckenridge

[11] Patent Number: 5,996,267
[45] Date of Patent: Dec. 7, 1999

[54] LANDING NET

[76] Inventor: David Gillies Breckenridge, 239 Bank Street, Irvine, Ayrshire, United Kingdom, KA12 0YB

[21] Appl. No.: 09/027,060

[22] Filed: Feb. 20, 1998

[30] Foreign Application Priority Data

Feb. 25, 1997 [GB] United Kingdom ............... 9703923

[51] Int. Cl.⁶ ........................................... A01K 77/00
[52] U.S. Cl. ........................................ 43/12; 43/11
[58] Field of Search .................................. 43/12, 11

[56] References Cited

U.S. PATENT DOCUMENTS

| | | | |
|---|---|---|---|
| 401,360 | 4/1889 | Marsters | 43/12 |
| 803,325 | 10/1905 | Brennaaun | 43/12 |
| 1,894,192 | 1/1933 | Olson | 43/12 |
| 2,066,439 | 1/1937 | Wine et al. | 43/12 |
| 2,455,765 | 12/1948 | Harvey | 43/12 |
| 2,491,703 | 12/1949 | Bell | 43/12 |
| 2,583,987 | 1/1952 | Baisor | 43/12 |
| 4,263,864 | 4/1981 | Carter, Jr. | 114/221 |
| 5,099,597 | 3/1992 | Whistle | 43/11 |
| 5,380,113 | 1/1995 | Boehm | 43/12 |
| 5,456,037 | 10/1995 | Dorval | 43/11 |
| 5,479,739 | 1/1996 | Livingston | 43/12 |
| 5,501,026 | 3/1996 | Bryant et al. | 43/12 |

FOREIGN PATENT DOCUMENTS 2290013A 12/1995 United Kingdom.

*Primary Examiner*—Peter M. Poon
*Assistant Examiner*—Judith A. Nelson
*Attorney, Agent, or Firm*—Flehr Hohbach Test Albritton & Herbert

[57] ABSTRACT

A landing net is described and comprises a hoop shaped net body member (17), which is secured to one end of a handle (13). A hinge (15) is located between the two ends of the handle (13) and which permits a section of the handle (13) to be folded from a first fully extended configuration to a second folded configuration in which the other end of the handle (13) is adjacent to the hoop shaped net body member (17). When the folding section of the handle (13) is in the second configuration, it is selectively attachable to the net body member (17).

39 Claims, 4 Drawing Sheets

LANDING NET

This invention relates to a landing net for use in fly fishing.

BACKGROUND OF THE INVENTION

In this field it is already known that landing nets are used to assist in the landing of fish caught by rod and line by using the landing net to support the fish as it is removed from the water.

Folding versions of landing nets are also known, whereby the landing net comprises a rigid handle of a distinct length, and a hoop shaped net frame on which the net is carried, where the net frame is coupled to one end of the handle by a hinge mechanism. The net frame is moveable between an in-use position where it and the handle coincide in the same plane, and a folded position in which the net frame is pivoted around the end of the handle such that the handle lies across the middle of the net frame for ease of transportation.

In the fly fishing art, it is also known for rigid or collapsible fly line trays to be used to aid casting during fly fishing, whereby the fly line tray helps to prevent the line from tangling, allowing the line to shoot and cast farther.

However, by having separate landing nets and fly line trays, this clearly means that the fisher would have to purchase both items, and further means that the line tray must be carried by the fisher over and above the landing net. Further, although a line tray will be used by the fisher throughout the days fishing, the landing net will not be used until a fish is caught.

Further, conventional folding landing nets have the disadvantage in that there is a tendency for the net to become entangled in the hinge mechanism when it is being unfolded. Also the loose netting is prone to snagging on trees, bushes and reeds which normally populate the riverbank fishing environment.

SUMMARY OF THE INVENTION

According to the present invention there is provided a landing net comprising a net body member, a handle, one end of the handle being secured to the net body member; and a hinge mechanism mounted at a location in the handle between the two ends of the handle to permit a folding section of the handle to be folded between a first configuration where substantially the whole length of the handle extends away from the net body member, and a second configuration in which the other end of the handle is substantially adjacent to the net body member.

Preferably, when the folding section of the handle is in the second configuration, the other end of the handle is selectively attachable to the net body member.

Preferably, the net body member comprises a hoop shaped member to which the net is attached.

Preferably, the hoop shaped member defines a plane, and the hinge mechanism is arranged such that when the handle is folded, the folding section of the handle moves in a plane parallel to the plane of the hoop shaped member, and more preferably, the folding section of the handle moves in a plane coincident to the plane of the hoop shaped member.

Typically, when the handle is in the first configuration, the handle is in a locked configuration.

Preferably, when the handle is in the second configuration, the handle is selectively attachable to the hoop shaped member by means of a handle attaching device. Preferably, the handle attaching device is a link between the handle and the hoop shaped member.

Typically, the handle attaching device comprises a bore into which the handle is inserted when the handle is in the second configuration, and an attachment clip for attachment of the handle attaching device to the hoop shaped member.

Preferably, the net body member comprises a second hoop shaped member which is located on a plane parallel to the first hoop shaped member, and more preferably, the longitudinal axis of the second hoop shaped member is coincident with the longitudinal axis of the first hoop shaped member.

Typically, the handle attaching device further comprises a second attaching means for attachment of the handle attaching device to the second hoop shaped member.

Typically, the handle attaching device is secured to a belt which typically is to be worn by the user of the folding landing net.

Typically, when the handle is in the second configuration, the net is pulled taught over the planar surface area of the second hoop shaped member to form a tray.

Preferably, the selective hinge mechanism comprises a locking member to lock the hinge mechanism when the handle is in the first configuration. Typically, the locking member is a slidable sleeve which is slidable over the hinge mechanism. Typically, the slidable sleeve is located around the hinge mechanism in the first configuration of the folding section of the handle, and is spaced from the hinge mechanism in the second configuration of the folding section of the handle.

Preferably, the slidable sleeve is biassed to be located around the hinge mechanism, and more preferably, the slidable sleeve is biassed by a spring.

BRIEF DESCRIPTION OF THE DRAWINGS

An embodiment of the invention will now be described, by way of example only, with reference to the accompanying drawings, in which.

DESCRIPTION OF PREFERRED EMBODIMENTS

Figure 1:
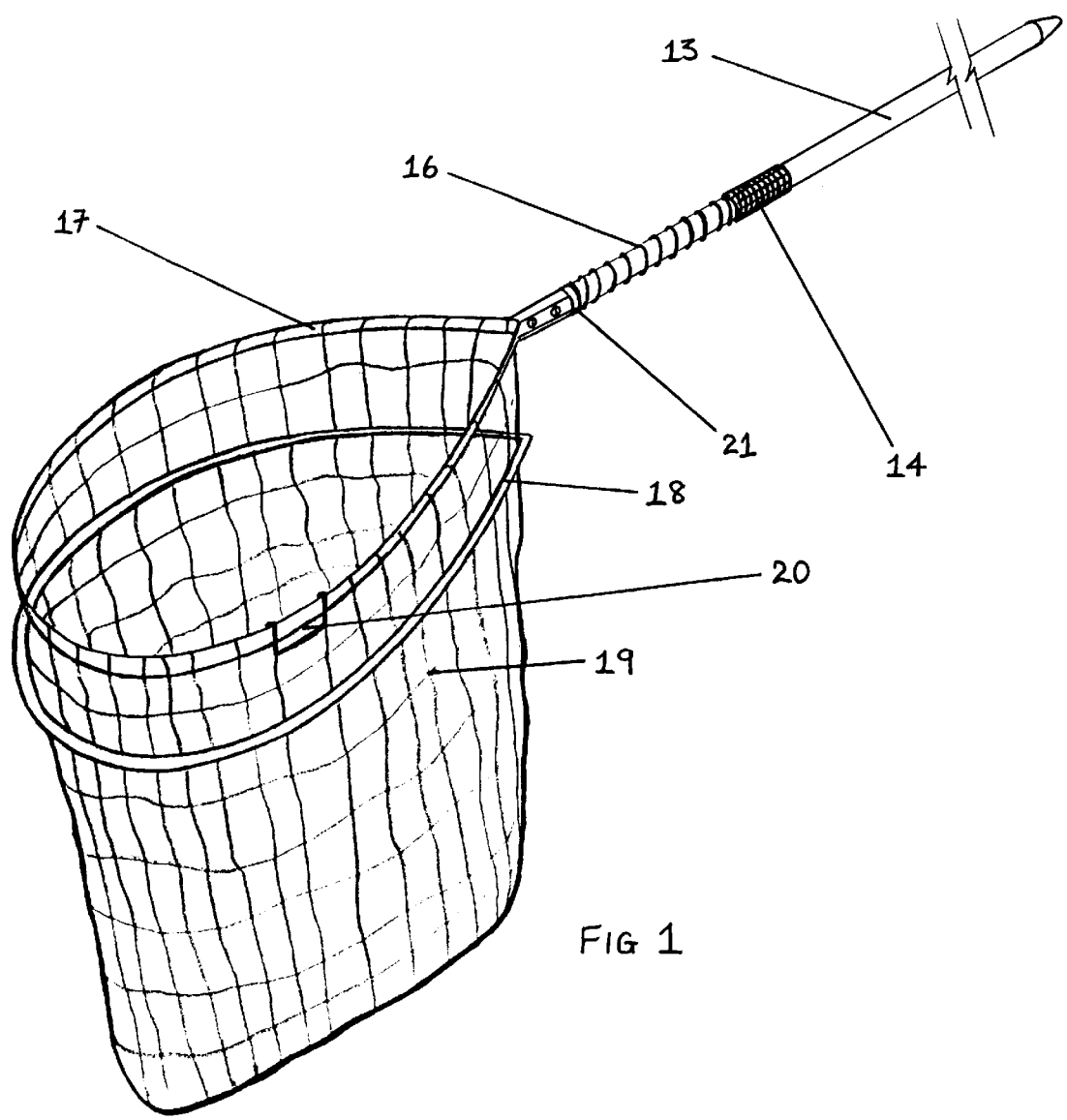
FIG. 1 is a perspective view of a landing net, in accordance with the present invention, in an open configuration, for use when landing a fish.

Referring firstly to FIG. 1, a landing net is shown which comprises a handle 13, one end of which is secured to both ends of a net body member, in the form of a net frame 17, by screws. The net frame 17 is hoop shaped and is threaded through a first loop formed at the open end of a netting 19, such that the net frame 17 carries the netting 19. A gap is left in the first loop of the netting 19 to form a net clip slot 20. A second loop, which is parallel to the first loop but spaced therefrom, is formed in the netting 19 through which is located a spacer ring 18, which is also hoop shaped.

A biassing means in the form of a spring 16 is located around the outer circumference of the handle 13, and is restrained at one end by a retaining sleeve 21. The other end of the spring 16 is attached to one end of a locking sleeve 14, such that when the locking sleeve 14 is in the position on the handle shown in FIG. 1, the locking sleeve 14 straddles (and masks in FIG. 1) a hinge mechanism in the form of a knuckle joint 15 (see FIG. 2) which is located at a distinct location on the handle 13. The landing net as shown in FIG. 1 is in the fully open configuration ready to be used as a landing net to aid the landing of a fish when caught by the fisher.

Figure 2:
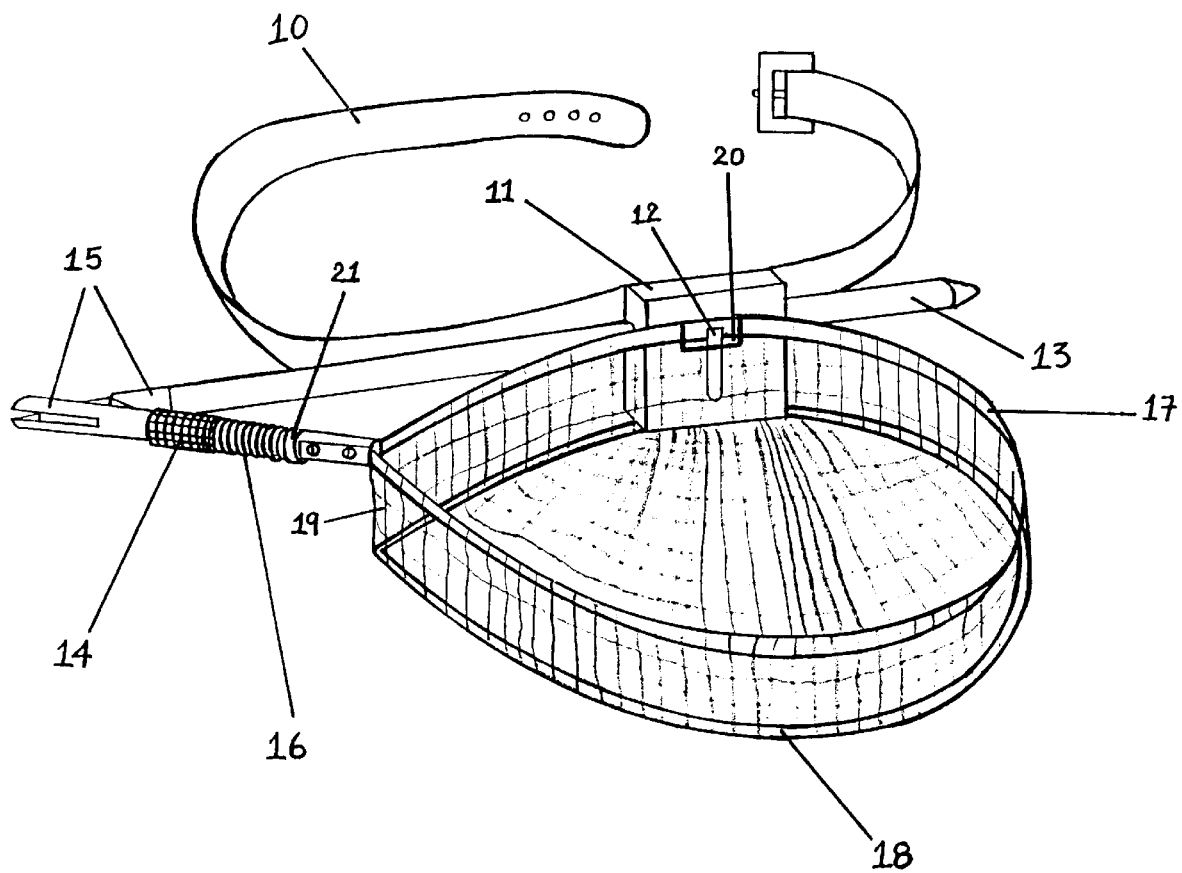
FIG. 2 is a perspective view of the landing net of FIG. 1, in a folded configuration, for use as a line tray, a laydown area, or a rod rest support.

Referring now to FIG. 2, a belt 10 is worn around the waist of the fisher (not shown) using the landing net. A support block 11 is secured to a portion of the waist belt 10, such that in use of the waist belt 10, the support block 11 is located adjacent the midriff of the fisher. A retaining clip 12 is mounted on the front face of the support block 11. The support block 11 also comprises an aperture which extends horizontally through the support block 11, and which is arranged parallel to the portion of the waist belt 10 on which the support block 11 is mounted.

Figure 3:
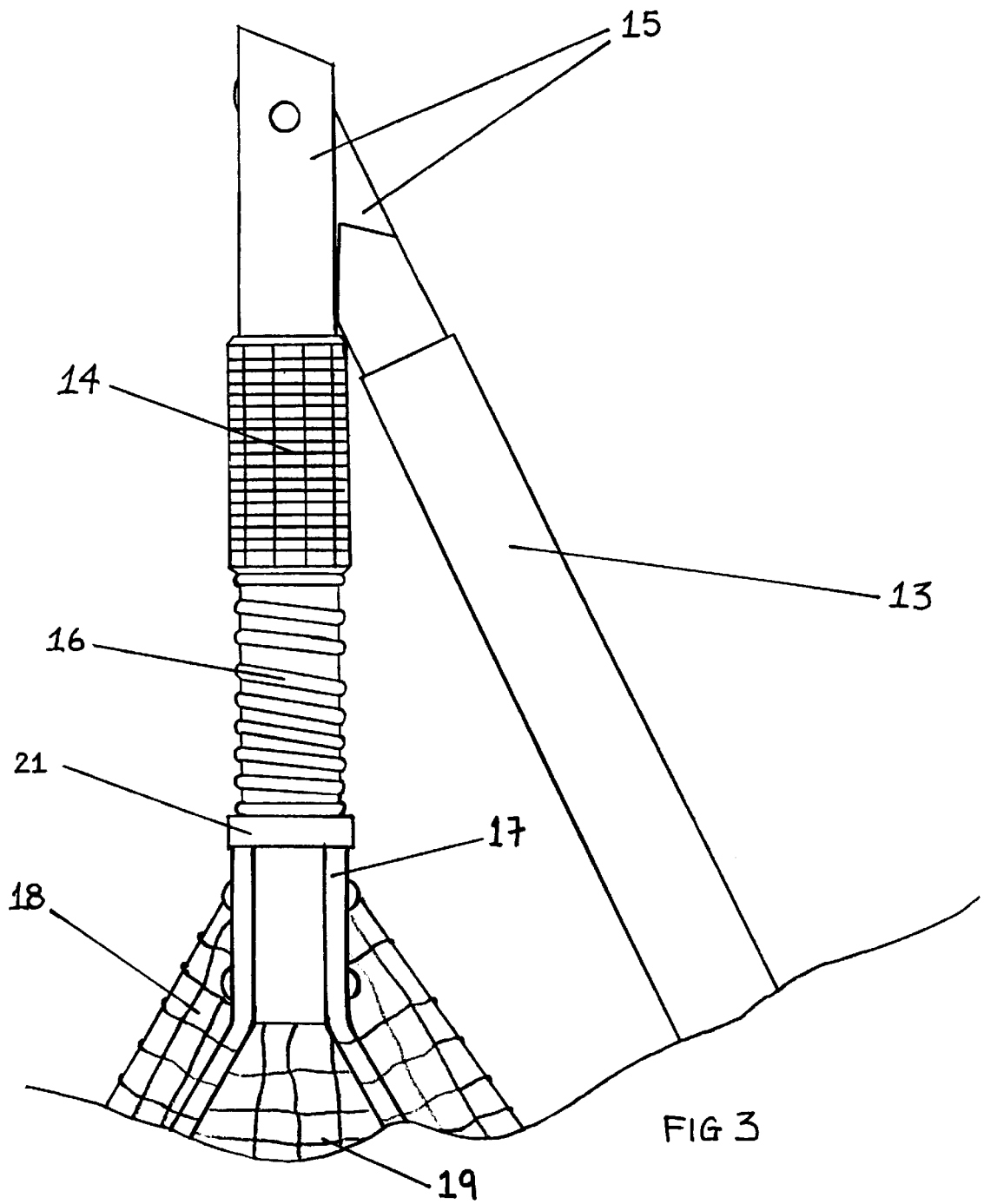
FIG. 3 is a cut away view of a portion on the landing net of FIG. 2, showing the folding hinge mechanism in more detail.

In order to convert the configuration of the landing net shown in FIG. 1, to that shown in FIG. 2, the following operation is observed. The other end of the net handle 13 is threaded through the aperture until it protrudes outwardly from the support block 11, as shown in FIG. 2. The locking sleeve 14 is then moved by hand by sliding it along a length of the handle 13, towards the one end of the handle 13, and thus against the biassing action of the spring 16. The locking sleeve 14 preferably has a tactile outer surface to facilitate gripping by hand. As the locking sleeve 14 is so moved, the knuckle joint 15 is exposed, which permits the fisher to rotate the net frame 17 about the knuckle joint 15, which can be seen in FIG. 3. The handle 13, the knuckle joint 15 and the net frame 17 are arranged such that the net frame 17 rotates on the same plane as the handle 13. Thus, the net frame 17 is adapted to be moved until a portion of its circumference makes contact with the support block 11. The net frame 17 and the support block 11 are arranged such that it is the net clip slot 20 and the retaining clip 12 that make contact. Thus, the net frame 17 can be clipped over the retaining clip 12 through the net clip slot 20. The net frame 17 is thereafter restrained from movement with respect to the support block 11 and the handle 13.

Figure 4:
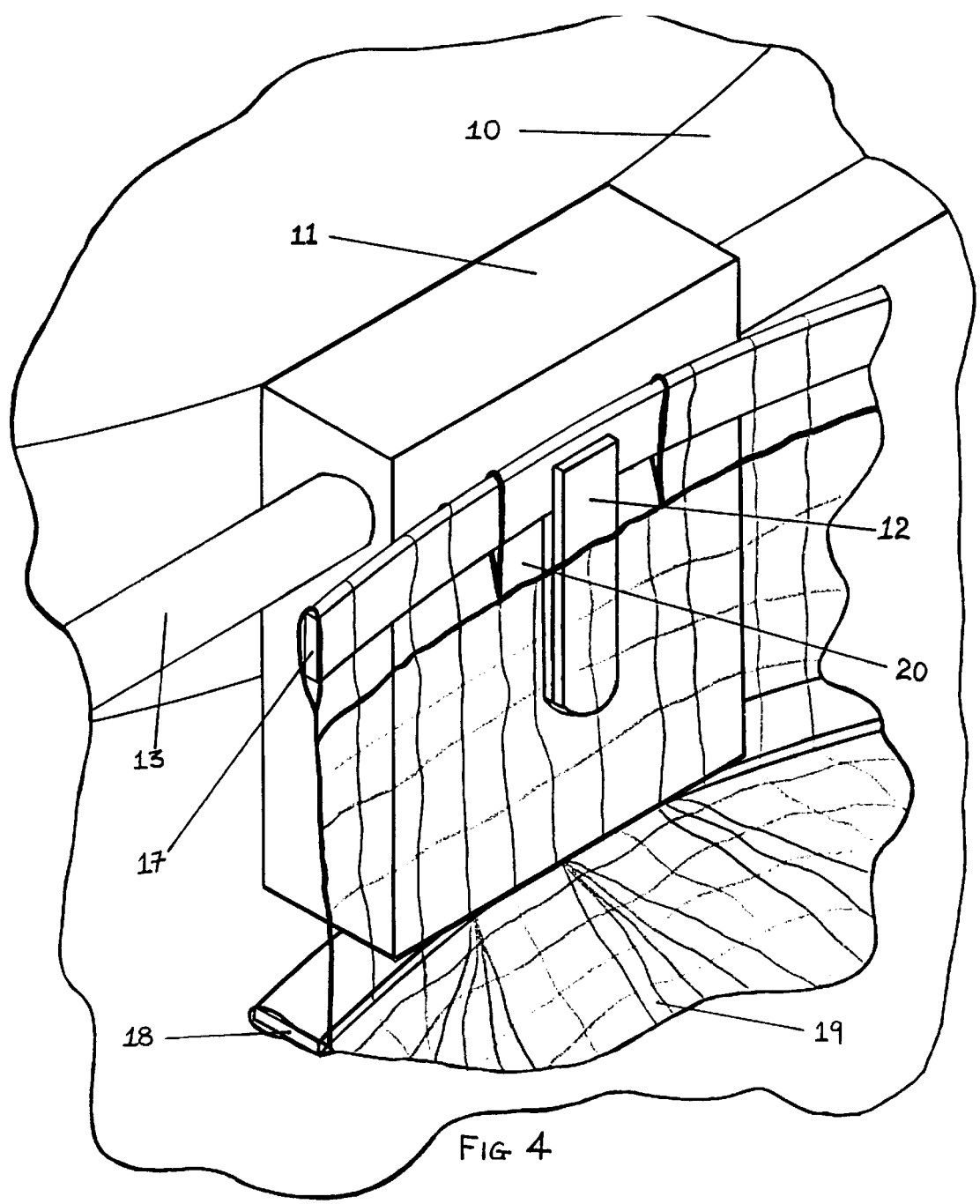
FIG. 4 is a cut away view of a portion on the landing net of FIG. 2, showing the support block in more detail.

The spacer ring 18 is tucked and thus located under the bottom edge of the support block 11, such that the netting 19 between the net frame 17 and the spacer ring 18 is taught. The longitudinal axis of the spacer ring 18 is now coincident with the longitudinal axis of the net frame 17. As can be seen in FIG. 4, the loose netting 19 located below the spacer ring 18 is pushed up and tucked between the midriff of the fisher's waist and the support block 11, and the weight and the resultant cantilever action of the net frame 17 keeps this netting 19 firmly in place. The netting 19 which lies on the cross sectional area of the spacer ring 18 is thus also taught, and can be used as a line tray, a tool laydown area, or a rod rest area, since the netting 19 located between the net frame 17 and the spacer ring 18 creates, and acts as, a sidewall. The landing net is now in the folded configuration.

To move the landing net back to the open configuration, the loose netting 19 is removed from between the support block 11 and the midriff of the fisher's waist, and the net frame 17 is removed from the retaining clip 12. The net frame 17 can now be rotated about the knuckle joint 15 and, in addition, this rotational movement is assisted by the biassing action of the spring 16 acting on the locking sleeve 14, since the locking sleeve 14 will act upon the knuckle joint 15. The biassing action of the spring acting on the locking sleeve can be more clearly seen in FIG. 3.

The other end of the handle 13 can now be withdrawn from the aperture of the support block 11, when required.

The invention has the advantage that the landing net can be constantly used in the folded configuration during actual fishing as opposed to a conventional landing net which is used infrequently.

There are various applications in which the landing net can be used when in the folded configuration, such as a fly line tray to aid casting, as a laydown area used as a working platform while changing flies, lines, reels or leaders and as a rod rest.

The invention further has the advantage since it is always at hand, and can be quickly converted back to a landing net for landing fish (i.e. the open configuration), by using only one hand.

Further, when a fisher is wading, the net can be used as a laydown area or a rod rest thereby reducing the need to come ashore.

Further, the side-folding semi-automatic operation keeps the netting away from the folding hinge mechanism thereby avoiding tangles.

Also, loose netting is secured under the support block 11, further preventing the netting becoming entangled in trees, bushes and reeds and the like, in contrast to a conventional net where the netting is left in a suspended configuration.

Further, the landing net is always visible as it is worn on the front of a fishers waist and is therefore less likely to be misplaced or forgotten.

Modifications and improvements may be made without departing from the scope of the invention.

I claim:

1. A landing net comprising a net body member, a handle, one end of the handle being secured to the net body member; and a hinge mechanism mounted at a location in the handle between two ends of the handle to permit a folding section of the handle to be folded between a first configuration where substantially the whole length of the handle extends away from the net body member, and a second configuration in which the folding section of the handle is substantially adjacent to the net body member, and when the folding section of the handle is in the second configuration, the folding section of the handle is selectively attachable to the net body member, wherein the net body member comprises a first hoop shaped member to which the net is attached, and a second hoop shaped member which is located on a plane substantially parallel to the first hoop shaped member.

2. A landing net according to claim 1, wherein the hoop shaped member defines a plane, and the hinge mechanism is arranged such that when the handle is folded, the folding section of the handle moves in a plane substantially parallel to the plane of the hoop shaped member.

3. A landing net according to claim 2, wherein the folding section of the handle moves in a plane coincident to the plane of the of the hoop shaped member.

4. A landing net according to claim 1, wherein when the handle is in the first configuration, the handle is in a locked configuration.

5. A landing net according to claim 1, wherein when the handle is in the second configuration, the handle is selectively attachable to the hoop shaped member by means of a handle attaching device.

6. A landing net according to claim 1, wherein a longitudinal axis of the second hoop shaped member is coincident with a longitudinal axis of the first hoop shaped member.

7. A landing net according to claim 6, wherein the handle attaching device further comprises a second attaching means for attachment of the handle attaching device to the second hoop shaped member.

8. A landing net according to claim 5, wherein the handle attaching device is securable to a belt.

9. A landing net according to claim 1, wherein when the handle is in the second configuration, the net is capable of being pulled taught over the planar surface area of the second hoop shaped member to form a tray.

10. A landing net according to claim 3, wherein the hinge mechanism comprises a locking member to lock the hinge mechanism when the handle is in the first configuration.

11. A landing net according to claim 10, wherein the locking member is a slidable sleeve which is slidable over the hinge mechanism.

12. A landing net according to claim 11, wherein the slidable sleeve is located around the hinge mechanism in the first configuration of the folding section of the handle, and is spaced from the hinge mechanism in the second configuration of the folding section of the handle.

13. A landing net according to claim 11, wherein the slidable sleeve is biased to be located around the hinge mechanism.

14. A landing net according to claim 13 wherein the slidable sleeve is biased by a spring.

15. A landing net comprising a net body member, a handle, one end of the handle being secured to the net body member; and a hinge mechanism mounted at a location in the handle between two ends of the handle to permit a folding section of the handle to be folded between a first configuration where substantially the whole length of the handle extends away from the net body member, and a second configuration in which the folding section of the handle is substantially adjacent to the net body member, and when the folding section of the handle is in the second configuration, the folding section of the handle is selectively attachable to the net body member and wherein the net body member comprises a hoop shaped member to which the net is attached, the hoop shaped member defining a plane, and the hinge mechanism is arranged such that when the handle is folded, the folding section of the handle moves in a plane coincident to the plane of the hoop shaped member, the hinge mechanism comprising a locking member to lock the hinge mechanism when the handle is in the first configuration.

16. A landing net according to claim 15, wherein when the handle is in the first configuration, the handle is in a locked configuration.

17. A landing net according to claim 15, wherein when the handle is in the second configuration, the handle is selectively attachable to the hoop shaped member by means of a handle attaching device.

18. A landing net according to claim 17, wherein the net body member comprises a second hoop shaped member which is located on a plane parallel to the first hoop shaped member, wherein the longitudinal axis of the second hoop shaped member is coincident with the longitudinal axis of the first hoop shaped member, and wherein the handle attaching device further comprises a second attaching means for attachment of the handle attaching device to the second hoop shaped member.

19. A landing net according to claim 17, wherein the handle attaching device is securable to a belt.

20. A landing net according to claim 15, wherein the net body member comprises a second hoop shaped member which is located on a plane parallel to the first hoop shaped member, and wherein when the handle is in the second configuration, the net is capable of being pulled taught over the planar surface area of the second hoop shaped member to form a tray.

21. A landing net according to claim 15, wherein the locking member is a slidable sleeve which is slidable over the hinge mechanism.

22. A landing net according to claim 21, wherein the slidable sleeve is located around the hinge mechanism in the first configuration of the folding section of the handle, and is spaced from the hinge mechanism in the second configuration of the folding section of the handle.

23. A landing net according to claim 21, wherein the slidable sleeve is biased to be located around the hinge mechanism.

24. A landing net according to claim 23, wherein the slidable sleeve is biased by a spring.

25. A landing net comprising a net body member, a handle, one end of the handle being secured to the net body member; and a hinge mechanism mounted at a location in the handle between two ends of the handle to permit a folding section of the handle to be folded between a first configuration where substantially the whole length of the handle extends away from the net body member, and a second configuration in which the folding section of the handle is substantially adjacent to the net body member, and when the folding section of the handle is in the second configuration, the folding section of the handle is selectively attachable to the net body member by means of a handle attaching device comprising a bore into which the handle is inserted when the handle is in the second configuration, and an attaching means for attachment of the handle attaching device to the net body member.

26. A landing net according to claim 25, wherein the net body member comprises a hoop shaped member to which the net is attached.

27. A landing net according to claim 26, wherein the hoop shaped member defines a plane, and the hinge mechanism is arranged such that when the handle is folded, the folding section of the handle moves in a plane substantially parallel to the plane of the hoop shaped member.

28. A landing net according to claim 27, wherein the folding section of the handle moves in a plane coincident to the plane of the hoop shaped member.

29. A landing net according to claim 25, wherein when the handle is in the first configuration, the handle is in a locked configuration.

30. A landing net according to claim 26, wherein the net body member comprises a second hoop shaped member which is located on a plane parallel to the first hoop shaped member.

31. A landing net according to claim 30, wherein a longitudinal axis of the second hoop shaped member is coincident with a longitudinal axis of the first hoop shaped member.

32. A landing net according to claim 31, wherein the handle attaching device further comprises a second attaching means for attachment of the handle attaching device to the second hoop shaped member.

33. A landing net according to claim 25, wherein the handle attaching device is securable to a belt.

34. A landing net according to claim 30, wherein when the handle is in the second configuration, the net is capable of being pulled taught over the planar surface area of the second hoop shaped member to form a tray.

35. A landing net according to claim 28, wherein the hinge mechanism comprises a locking member to lock the hinge mechanism when the handle is in the first configuration.

36. A landing net according to claim 35, wherein the locking member is a slidable sleeve which is slidable over the hinge mechanism.

37. A landing net according to claim 36, wherein the slidable sleeve is located around the hinge mechanism in the first configuration of the folding section of the handle, and is spaced from the hinge mechanism in the second configuration of the folding section of the handle.

38. A landing net according to claim 36, wherein the slidable sleeve is biased to be located around the hinge mechanism.

39. A landing net according to claim 38 wherein the slidable sleeve is biased by a spring.

* * * * *